United States Patent

Ogiso et al.

[15] 3,688,669
[45] Sept. 5, 1972

[54] CAMERA CONTROL SYSTEM

[72] Inventors: Mitsutoshi Ogiso, Kawasaki; Hiroshi Aizawa, Tokyo, both of Japan

[73] Assignee: Canon Kabushiki Kaisha, Tokyo, Japan

[22] Filed: Nov. 23, 1970

[21] Appl. No.: 91,927

[52] U.S. Cl..............95/31 AC, 95/31 EL, 95/31 FL
[51] Int. Cl.............................................G03b 19/04
[58] Field of Search.............95/31 AC, 31 FL, 31 EL

[56] References Cited

UNITED STATES PATENTS

| | | |
|---|---|---|
| 3,434,405 | 3/1969 | Friedman..............95/31 EL X |
| 3,470,803 | 10/1969 | Fukuoka..................95/31 EL |
| 3,448,670 | 6/1969 | Suzuki.....................95/31 EL |
| 3,007,385 | 11/1961 | Fukuoka..................95/31 EL |
| 3,064,522 | 11/1962 | Fukuoka..............95/31 EL X |
| 3,348,462 | 10/1967 | Fahlenberg..............95/53 EA |
| 3,386,364 | 6/1968 | Hayden...................95/53 EA |

*Primary Examiner*—Samuel S. Matthews
*Assistant Examiner*—Monroe H. Hayes
*Attorney*—McGlew & Toren

[57] ABSTRACT

A film winding-up system which is characterized by a camera driving mechanism, which is so designed to give one electric signal respectively at the time the film wind-up is completed and at the time the shutter is released. A control circuit is alternatively held in a conductive state by said electric signals, and the system is so arranged that the activation of the shutter release controlling circuit is prepared at the time of completion of film winding-up and the activation of the film winding-up controlling circuit is prepared at the time of shutter release, respectively.

12 Claims, 7 Drawing Figures

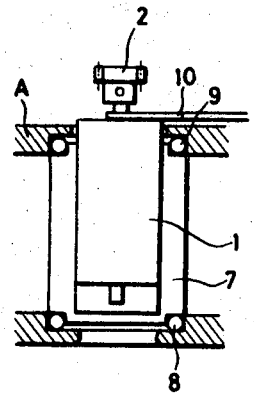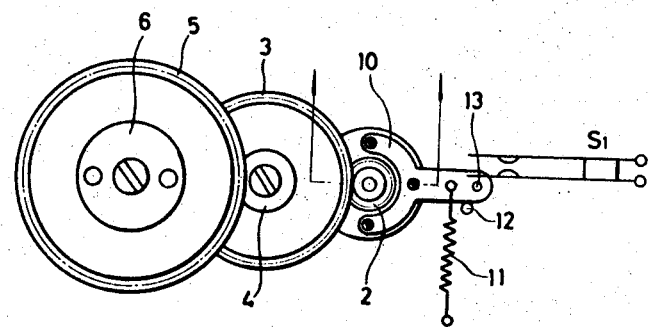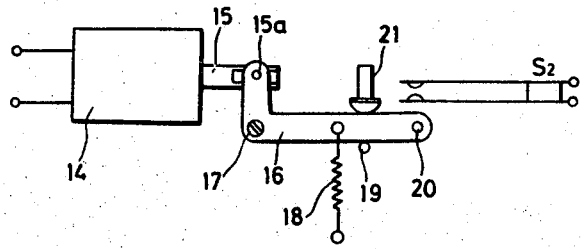

CAMERA CONTROL SYSTEM

The present invention relates to a film winding-up system, particularly a film winding-up system of remarkably simplified mechanical construction.

Main objects and features of the present invention are to provide a film winding-up system characterized by that a camera driving mechanism, which is so designed as giving one electric signal respectively at the time as the film winding-up is completed and at the time as the shutter is released, is related with a control circuit which is alternatively held in a conductive state by said electric signals, and that the system is so arranged that the activation of the shutter release controlling circuit is prepared at the time of completion of film winding-up and the activation of the film winding-up controlling circuit is prepared at the time of shutter release, respectively.

The present invention will be described by referring to the attached drawings in which:

FIG. 2 is a vertical sectional view for explaining an electric motor supporting mechanism of the film winding-up device of a system according to the present invention.

FIG. 3 is a plan view for explaining a film winding-up mechanism provided with an electric motor.

FIG. 4 is a schematic view of a shutter release device of a system according to the present invention.

Figure 1:
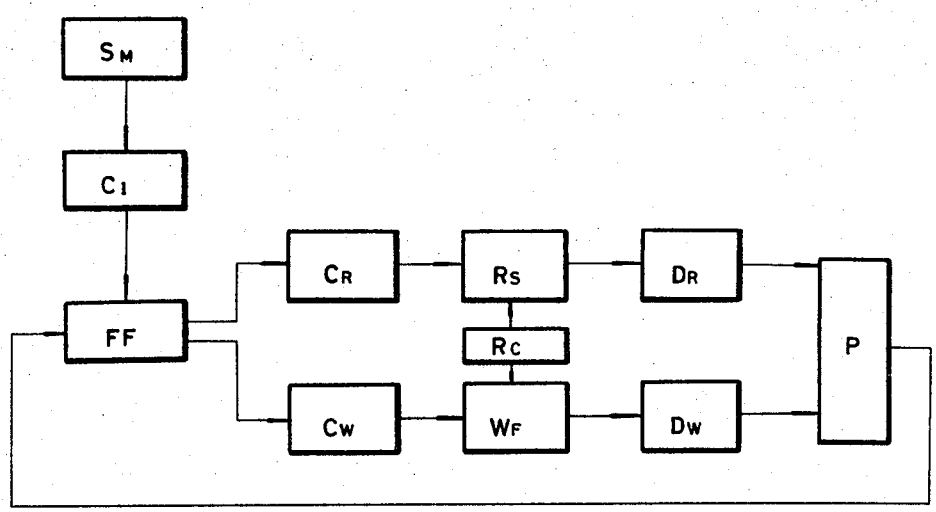
FIG. 1 is a block diagram of a film winding-up system according to the present invention.

In FIG. 1, FF shows a flip-flop circuit, $C_o$ is a shutter release controller circuit controlled by a first output from the flip-flop circuit FF, Rs is a shutter release means controlled by a camera release means Rc and actuated by an output from the shutter release controller circuit $C_o$, $D_R$ is a shutter release means detecting means actuated by an output from the shutter release means Rs, Cw is a film winding controller circuit controlled by a second output from the flip-flop circuit FF, $W_F$ is a film winding-up means controlled by the camera release means Rc and actuated by an output from the film winding controller circuit Cw, Dw is a film winding detecting means actuated by an output from the film winding-up means $W_F$, P is a pulser receiving either an output from the shutter release detecting means $D_R$ or an output from the film winding detecting means Dw, CI is an initial conditioner for controlling the flip-flop circuit FF, and $S_M$ is a main switch.

When the main switch $S_M$ is closed the initial conditioner $C_I$ conditions the flip-flop circuit FF, and thereafter when the camera release means Rc is operated, the shutter release means Rs is activated to deliver therethrough an output from the shutter release controller circuit $C_R$ to the shutter release detecting means $D_R$. After the completion of the shutter operation, the shutter release detecting means $D_R$ receives an output signal from the shutter release means Rs, and delivers the output signal to the pulser P to change over the flip-flop circuit FF from the initially conditioned state of actuating the shutter release controller circuit $C_R$ to a film winding-up state of actuating the film winding-up controller circuit Cw. The film winding-up controller circuit Cw thus actuated delivers its output to the film winding-up means $W_F$ under the control of the camera release means Rc. When the camera release means Rc ceases to control the film winding-up means $W_F$, the film winding detecting means Dw receives an output from the film winding means $W_F$ to change over the flip-flop circuit FF through the pulser P. Sw is a signal from the film winding-up means $W_F$ and $S_R$ is a signal from the shutter release means Rc. Thus the flip-flop circuit FF restores to its initially conditioned state for the next camera release.

In FIGS. 2 and 3, 1 is an electric motor for film winding-up, 2 is a driving gear fixedly installed to the rotating shaft of the motor 1, and 3, 4 and 5 are gears, the former one gear 3 of which engages to the driving gear 2, and the middle one gear 4 of which engages with the latter one gear 5 in succession. 6 is a film winding-up joint fixed to the latter gear 5. 7 is a holder fixedly installed to the electric motor 1 in place, 8 and 9 are balls for bearings for rotatablly supporting the holder 7 within a housing body A, 10 is an operating arm for a switch $S_1$ fixedly provided at the electric motor 1, being biased to swing in a clockwise direction (see FIG. 3) by a spring 11. 12 is a stopper pin to limit the swinging of the operating arm 10 against the spring 11. 13 shows a switch operating pin planted at a free end of the operating arm 10 for controlling closure and opening of a switch $S_1$. In the electric film winding-up device as shown in FIG. 2 and FIG. 3, the rotatary driving force of the electric motor 1 is transmitted to the winding-up joint 6 through the intermediate gears 3 to 5, and the holder 7 is rotatably placed within the housing body A as shown in FIG. 1, while the switch $S_1$ is closed and opened by the arm 10.

Figure 5:
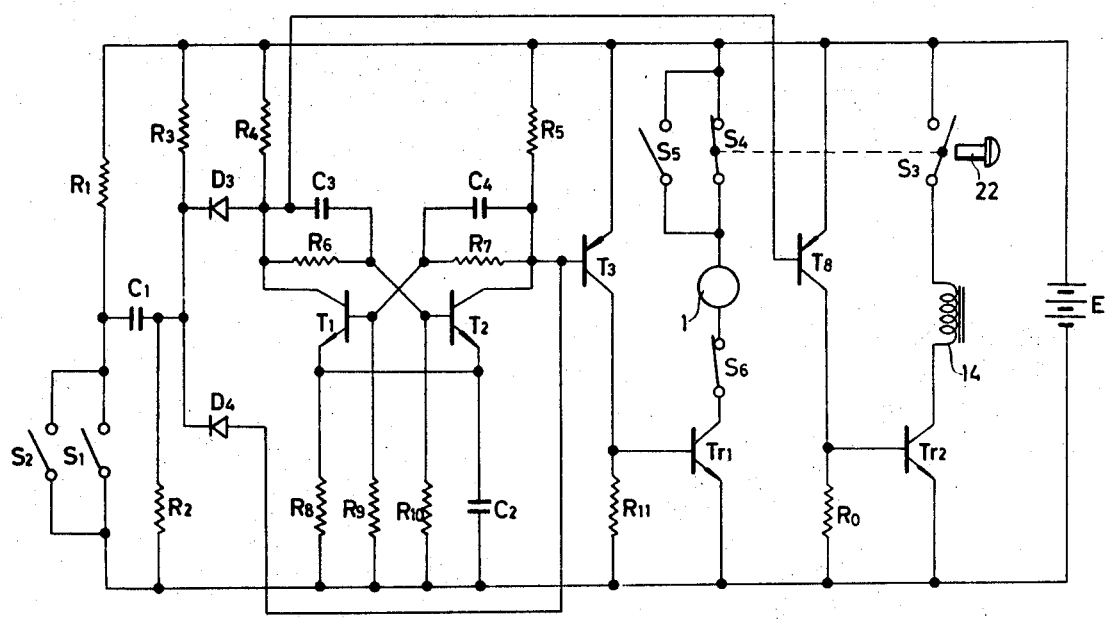
FIG. 5 is a schematic view of a bistable control circuit of a system according to the present invention.

Next, in FIGS. 4 and 5, 14 is an electro-magnet for shutter release, 15 is an attracting member partly installed in and operatively combined with the electro-magnet 14 and 15a is a member attracted by and engaged with the attracting member 15. 16 is a release lever having the member 15a fixed at its one end and is rotatable around an axle 17, and 18 is a spring to provide clockwise rotating force to the release lever 16 against a stopper pin 19, which stopper pin limits the rotation of the lever 16 in a clockwise direction at a predetermined position, and 20 shows an operating pin planted at a free end of the lever 16 for operating a switch $S_2$.

When the release lever 16 is pressed down by a release button 21 of a camera, the operating pin 20 opens the switch $S_2$.

In FIG. 5, 22 is an operating button for such a device as simultaneously opening and closing or closing and releasing switches $S_3$ and $S_4$ respectively, and a change over switch $S_5$ is for changing over from one single frame shooting at its opening to multi-frame shooting at its closure, and $S_6$ is a switch linked with shutter for retaining the electric motor 1 in an inactive state only when the shutter is activated, and is opened at such a time that relatively longer time of exposure is attained. E is a power source for a series circuit comprising the switch $S_3$, a relay coil 14 and a drive controller transistor $Tr_2$, and for a series circuit comprising the switch $S_4$, the electric motor 1, the switch $S_6$ and a drive controller transistor $Tr_1$, both of which series circuits being connected to the power source E respectively in parallel. The other parts of the circuits are so made up that when pulse input is given by the switching action of the switches $S_1$, $S_2$, the transistors $Tr_1$, $Tr_2$ are alternately held in a conductive state or in a non-conductive state, and these other parts have a so called flip-flop circuit construction.

Further in FIG. 5, $R_0$ to $R_{11}$ are resistors, $C_1$ to $C_4$ are capacitors, $D_3$ and $D_4$ are diodes, $T_1$ to $T_3$ and $T_8$ are transistors.

Now the function of the device shown in FIG. 2 to FIG. 5 shall be explained.

The phase shown in FIG. 2 through FIG. 4 corresponds to the state of a partial film winding-up for one frame photographing, wherein as the transistor $Tr_1$ is in a conductive state the electric motor 1 rotates to effect film winding-up action, and as the joint 6 is prevented from rotating when the winding-up is completed, the electric motor 1 attains a state of increased torque from such a state that the tension of the spring 11 overcomes the reaction of winding-up at the time of ordinary winding-up so that the winding-up reaction overcomes the tension thus causing the electric motor holder 7 to rotate. Then the pin 13 puts the switch $S_1$ into "on" state.

Thereby a pulse is given to one of the input terminals of the flip-flop circuit, and the flip-flop circuit is reversed from the conductive state of the transistor $Tr_1$ and the non-conductive state of the transistor $Tr_2$ to the non-conductive state of the transistor $Tr_1$ and the conductive state of the transistor $Tr_2$. Therefore, the electric motor 1 stops its rotation and the holder 7 resumes its original position as shown in FIG. 3 by the tension of the spring 11 as the driving torque disappears.

While the release electro-magnet 14 is put in a preparatory state for activation by the transfer of conductive state from the transistor $Tr_1$ to the transistor $Tr_2$, as the camera operating button 22 has not been pressed, the device is stopped and retained in a winding-up completion state. Next, as the button 22 is pressed, the shutter releasing electro-magnet 14 is energized, and the release lever 16 is rotated by the attracting member 15, then further the shutter button 21 is pushed up to activate the shutter of a camera. Further the lever 16 puts the switch $S_2$ into "on" state by the pin 20 positioned thereon. As a result, a pulse is again given to the other of the input terminals of the flip-flop circuit and the flip-flop circuit is again reversed from the state of the transistor $Tr_1$ off and the transistor $Tr_2$ on to the state of the transistor $Tr_1$ on and $Tr_2$ off. Therefore, the electro-magnet 14 is dienergized, losing its attracting power and thus being brought to its original state (as shown in FIG. 4) by the tension of the spring 18. On the other hand, even if the transistor $Tr_1$ is in a preparatory state for conduction, as long as the camera operating button 22 is pressed, the switch $S_4$ is in an "off" state and the electric motor 1 does not rotate; therefore the device is held in a stopped state. Next, as the camera operating button 22 is released, the electric motor 1 is energized to start winding-up action, then the device attaining the original state through the same process as mentioned hereinbefore, thus completing one cycle of the one frame photographing.

Next in the case of a multi-frame photographing, the switch $S_5$ is put into an "on" state, and in this case as the transistor $Tr_1$ is put in a conductive state by completion of a frame shooting even if the switch $S_4$ is in "off" state, its by-pass switch $S_5$ is "on", therefore by starting up and completion of film winding-up the transistor $Tr_2$ is put in a conductive state as the switch $S_3$ is in "on" state. As a result the electro-magnet 14 is energized and the transistor $Tr_1$ is put into a conductive state by action of the switch $S_2$, and at the same time the film winding-up and the shutter release are automatically repeated, and thus only by the release of the camera operating button 22 the winding-up is completed and stopped, thus a successive multi-frame photographing is achieved.

Further, for a remote control, since the device is all controlled by switching action of the switches, it is possible to provide a wired remote control device or to modify a radio or wireless remote control device with simple wiring of the remote control part with an extension cord, or with application of a ray box for radio control respectively.

Multi-frame photographing of a rather long interval is attained by the switch $S_6$ controlled by a timer.

Figure 6:
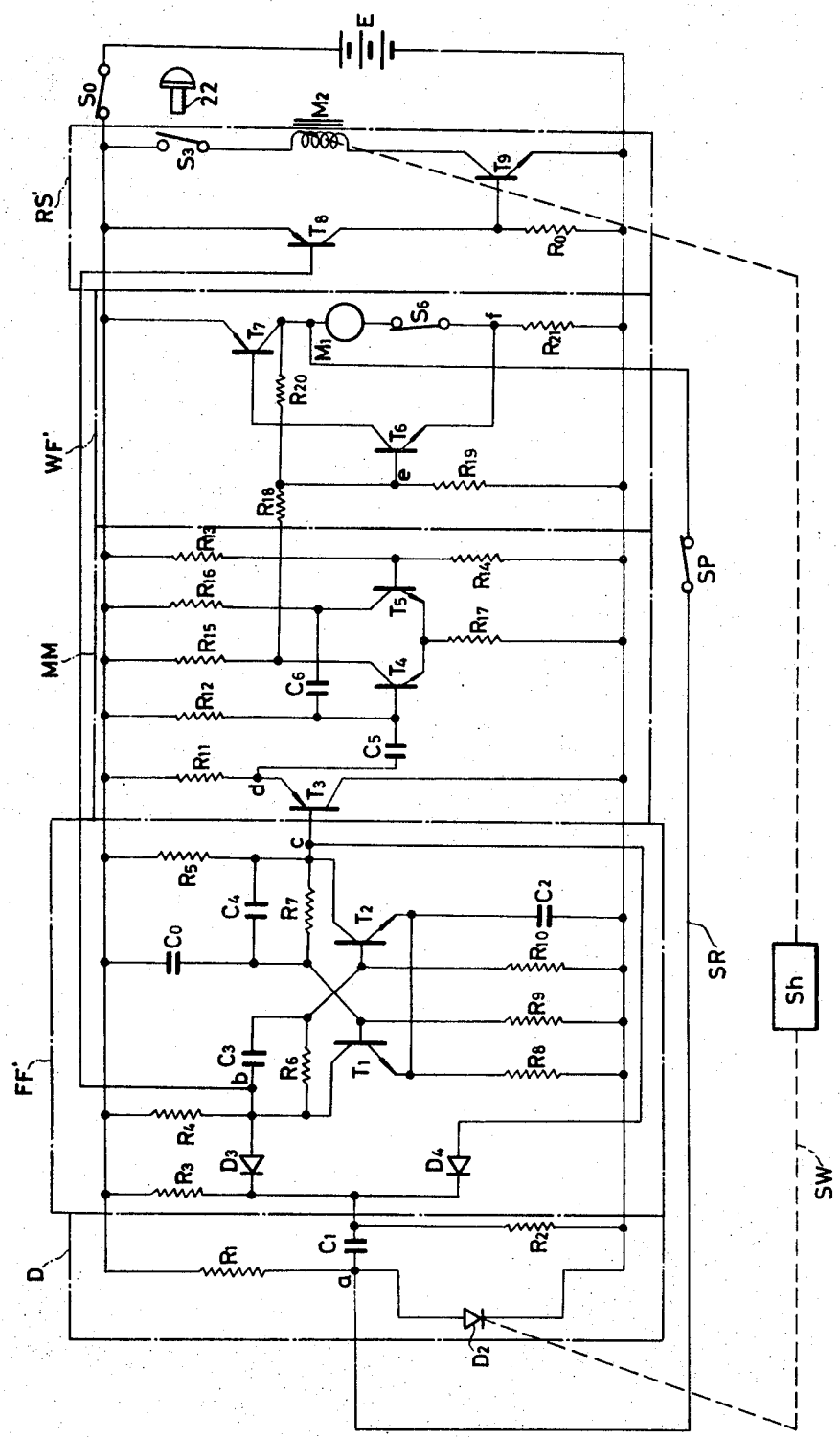
FIG. 6 is a circuit construction of another embodiment of a system according to the present invention.

Now referring to FIG. 6 which is a circuit construction in case the mechanism shown in FIGS. 2 and 3 are replaced by an electric circuitry, FF' is a slight modification of the flip-flop circuit shown in FIG. 5; the only difference being that a capacitor C0 is additioned for initial conditioning of the flip-flop circuit. MM is a mono-stable multi-vibrator, WF' is a modification of the film winding-up means shown in FIG. 5, and RS' is a modification of the shutter release means shown in FIG. 5. So is a main switch which sets the flip-flop circuit FF' into an initially conditioned state for the camera operation. Sp is a program switch, and $D_2$ is a switching means such as a pressure sensitive diode illustratively which is associated with an electro-magnet $M_2$ for shutter releasing through a timer device Sh such as a shutter mechanism. D is a detector which controls the flip-flop circuit FF' and which receives an electric signal $S_R$ from the film winding-up means WF', and receives a signal Sw from the electro-magnet $M_2$ of the shutter release means RS'. In the mono-stable multi-vibrator MM, $R_{11}$ to $R_{17}$ are resistors, $C_5$ is a capacitor for differentiation of the output from the flip-flop circuit FF', $C_6$ is a timer capacitor, and $T_4$ and $T_5$ are transistors.

Next, in the circuit of the film winding-up means WF', $R_{18}$ to $R_{21}$ are resistors, $T_6$ and $T_7$ are transistors, and $S_6$ is a switch as shown in FIG. 5. In the circuit of the shutter release device RS', $T_8$ and $T_9$ are transistors. The functional explanations of the device shown in FIG. 6 are set forth by referring to FIG. 7 which shows behaviors of the device.

Figure 7:
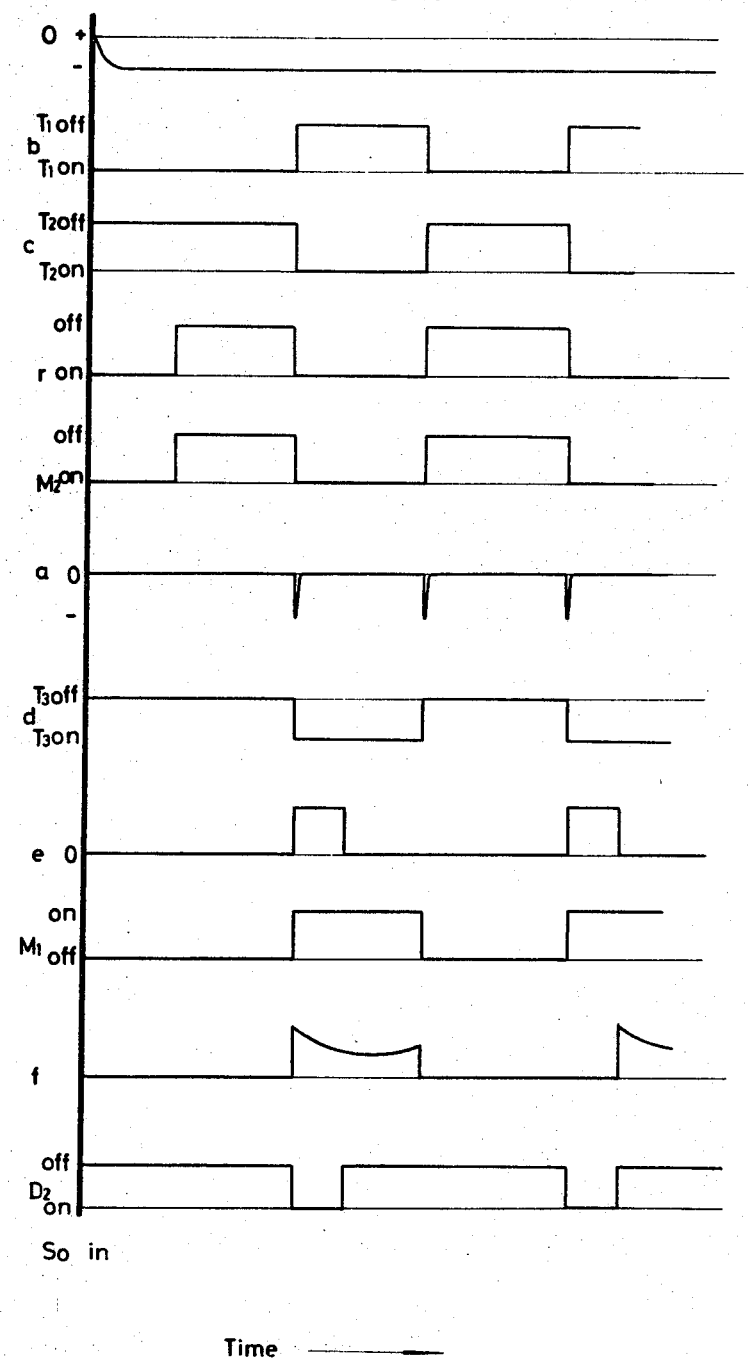

When the main switch So is put in, the level at the point 0 decreases to a constant level as shown by "0" in FIG. 7, then the level at the point $b$ and $c$ in FIG. 6 varies instantaneously into the initially conditioned state of "$T_1$ on" and "$T_2$ off" through differentiation of the circuit of Co and $R_9$ as shown by $b$ and $c$ in FIG. 7. Thereafter, when the camera operating button 22 is pushed from the off-state of the switch $S_3$ to the on-state of the same as shown by $r$ in FIG. 7, the electro-magnet $M_2$ starts to release the shutter operation as shown by M in FIG. 7. When the shutter operation is completed, the switching means $D_n$ turns "on" pulsively to effect automatically the transfer of the flip-flop circuit FF' to "$T_1$ off" and "$T_2$ on" with a negative pulse at the point "a" in FIG. 6 as shown by $D_2$, b, c and a in FIG. 7. Thus, the level at the point d in FIG. 6 decreases from a state of "$T_3$ off" to a state of "$T_3$ on" as shown by d in FIG. 7. One shot from the mono-stable multi-bivrator MM thus appears at the point e in FIG. 6 as shown by e in FIG. 7 through the differentiating capacitor $C_5$ and the timer capacitor $C_6$. The motor $M_1$ for film winding starts to rotate with the transfer of the flip-flop circuit FF' as shown by $M_1$ in FIG. 7. At this time, the electro-magnet $M_2$ is dienergized with the transfer of the flip-flop circuit FF'. Thereafter, when the film winding with a normal current is completed, the motor $M_1$ is restricted its rotation by a stopper for registration of the film. Under this condition, the rush current through the motor $M_1$ causes the level at the point of in FIG. 6 to increase as shown by f in FIG. 7. The rush current causes the level at transfer of the flip-flop circuit FF' and the motor $M_1$ back to their initially conditioned state again. In case of multi-frame shooting, the magnet $M_2$ is automatically brought into the released state with the signal $S_R$ with the program switch $S_P$ closed. In case of single frame shooting, as the program switch $S_P$ is opened, the signal $S_R$ is not delivered to the point a.

For the next single frame shooting, the operator has only to push the camera operating button 22.

The timer device Sh is reset or charged by the film winding motor $M_1$. The capacitors $C_1$ and $C_2$ serve to present the noise of the circuit for assuring accurate operation of the device. The circuit is very effective for thermal compensation as it is of a synmetrical circuit structure. Of course, any of the resistors may be replaced by a thermister. As for the flip-flop circuit FF', modifications such as a modified bistable multivibrator may be applied.

For the initial conditioning, the capacitor Co may be omitted, but in this case a capacitor is provided in place of the resistor $R_{10}$.

The diodes $D_3$ and $D_4$ permit the pass therethrough of a negative pulse as shown by a in FIG. 7.

The operation of the film winding means WF' in FIG. 6 will be described further in detail.

As the resistors $R_{19}$, $R_{20}$, $R_{21}$ and the coiling of the motor $M_1$ constitutes a bridge circuit in which the level $V_e$ at the point e is higher than the level $V_f$ at the point f under the condition of rotation of the motor $M_1$, when the motor rotates, the transistors $T_6$ and $T_7$ are conductive. On the contrary under the condition of a low speed of the motor $M_1$ with a large mechanical load, the level $V_b$ becomes smaller than the level $V_c$ to bring the transistors $T_6$ and $T_7$ into a non-conductive state for stoppage of the motor $M_1$.

For prevention of the rush current from passing through the motor $M_1$ at the beginning of the rotation of the motor $M_1$, the mono-stable multi-vibrator supplies a signal as shown by e in FIG. 7 to cause $V_e > V_f$ compulsively, namely to make the transistor $T_4$ non-conductive and the transistor $T_6$ conductive through the resistors $R_{15}$ and $R_{18}$. Therefore the motor $M_1$ stops automatically only when the transistor $T_6$ is conductive and the motor $M_1$ is overloaded. Under the steady condition of "$T_4$ on" and "$T_5$ off", the bridge circuit of the coiling of the motor $M_1$ the resistors $R_{21}$, $R_{20}$ and a combined resistor circuit of the resistors $R_{17}$, $R_{18}$ and $R_{19}$ can not be brought into a state of $V_e < V_f$, and thus the transistors $T_6$ and $T_7$ are non-conductive and the motor $M_1$ does not rotate. When one shot of negative pulse is applied to the point d, the transistor $T_4$ is forced to be non-conductive for a constant time determined by the resistor $R_{12}$ and the capacitor $C_5$, and the base current flows into the transistor $T_6$ through the resistors $R_{15}$ and $R_{18}$ to turn on the transistor $T_6$, and therefore, to turn on the transistor $T_7$ to start the rotation of the motor $M_1$. In this case, at the beginning of the rotation of the motor $M_1$, as rush current flows therethrough, the level $V_f$ becomes higher than the level $V_e$ under the condition of "$T_4$ on". However, as the transistor $T_4$ is at its off-state, the level $V_e$ becomes larger than the level $V_f$ for continuing the rotation of the motor $M_1$. Although the transistor $T_4$ becomes conductive, after the constant time, the state of $V_e > V_f$ is maintained by the back electromotive force of the motor $M_1$ due to its rotation. When the motor $M_1$ is overloaded, the rotation speed of the motor $M_1$ drops down to reduce the back electromotive force and thus $V_e$ becomes lower than $V_f$ to make the transistors $T_6$ and $T_7$ off to stop the motor $M_1$. The condition for stoppage of the motor $M_1$ may be controlled by providing at least one variable resistor as for any of the resistors $R_{15}$, $R_{18}$, $R_{19}$, $R_{20}$ and $R_{21}$.

In the device shown in FIG. 6, a positive pulse at the point e is supplied from the mono-stable multi-vibrator of the transistors $T_4$ and $T_5$ during the rush current passage through the motor $M_1$. However, the multivibrator MM may be replaced by means having a switch or a relay.

As has been explained above the device according to the present invention with a very simple structure functions fully as will be required for this kind of device with many advantages such as the high degree of durability of the device, high degree of safety of operation, little dependability on cases and low manufacturing cost as being assuredly derived from the omittance of the complication of the mechanism, and thus the present invention has great industrial advantages.

What is claimed is:

1. A camera control system, comprising a flip-flop circuit having an input and a pair of alternately poled outputs, a shutter release control circuit connected to one of said outputs so as to be controlled by the flip-flop circuit shutter release means connected with the shutter release control circuit and responsive thereto, camera release means, said shutter release means being actuated by said camera release means and controlled by said shutter release control circuit, shutter release detecting means responsive to said shutter release means for producing signals indicative of operation of said shutter release means, a film winding control circuit connected to the other output of said flip-flop circuit and controlled by the potential at the other output of the flip-flop circuit, film wind-up means connected with the film winding control circuit and operative by the film winding control circuit, film winding detecting means responsive to said film wind-up means for producing signals indicating operation of said film wind-up means, and a pulser responsive to a signal from the shutter release detecting means and a signal from the film winding detecting means and connected to the input of the flip-flop circuit for reversing the flip-flop circuit in response to signals to the shutter release detecting means and the film winding detecting means.

2. A camera control system according to claim 1 which further comprises an initial conditioner for controlling the flip-flop circuit.

3. A camera control system according to claim 2 which further comprises a main switch and in which the initial conditioner controls the flip-flop circuit when the main switch is closed.

4. A camera control system according to claim 1 in which the film winding detecting means comprises a deformable member, and the pulser comprises a switch controlled by the deformable member.

5. A camera control system according to claim 4 in which the deformable member is a pressure sensitive semi-conductor which functions as a pulser switch.

6. A camera control system according to claim 1 in which the film winding detecting means comprises an integrator circuit actuated by a current through the film winding-up means.

7. A camera control system according to claim 1 in which the shutter release detecting means comprises a deformable member and the pulser comprises a switch controlled by the deformable member.

8. A camera control system according to claim 1 in which the camera release means comprises a first switching member connected in series with the shutter release means and a second switching member for prevention of the film wind-up connected in series with the film wind-up means, both said switching members being associated with each other.

9. A camera control system according to claim 8 which further comprises a change-over switching member connected in parallel with the second switching member, said change-over switching member being closed only when multi-frame shooting is performed.

10. A camera control system according to claim 1 which further comprises a safety switching member for preventing a power supply to the film wind-up means, said safety switching member being opened during the shutter operation.

11. A camera control system according to claim 1 in which the pulser comprises noise absorbing means for prevention of erroneous operation of the flip-flop circuit.

12. A control system for a camera having a shutter and a film winder, comprising flip-flop means having an input and two alternately poled outputs for controlling the shutter, release means coupled to said shutter control means for enabling said shutter control means, film winding control means responsive to the other output of said flip-flop means for actuating the winder, pulse means responsive to said film winding control means and said shutter control means for issuing pulses in response to each of said control means and for applying them to the input of said flip-flop means.

* * * * *